(12) United States Patent
Rom

(10) Patent No.: US 7,054,509 B2
(45) Date of Patent: May 30, 2006

(54) DETERMINING FORM IDENTIFICATION THROUGH THE SPATIAL RELATIONSHIP OF INPUT DATA

(75) Inventor: Mark Rom, Escondido, CA (US)

(73) Assignee: Cardiff Software, Inc., Vista, CA (US)

( * ) Notice: Subject to any disclaimer, the term of this patent is extended or adjusted under 35 U.S.C. 154(b) by 585 days.

(21) Appl. No.: 09/804,835

(22) Filed: Mar. 13, 2001
(Under 37 CFR 1.47)

(65) Prior Publication Data

US 2002/0146170 A1    Oct. 10, 2002

Related U.S. Application Data

(60) Provisional application No. 60/242,369, filed on Oct. 21, 2000.

(51) Int. Cl.
*G06K 9/54* (2006.01)
*G06K 9/60* (2006.01)

(52) U.S. Cl. .................... 382/306; 382/217

(58) Field of Classification Search ............ 715/505; 382/175, 209, 217, 282, 306
See application file for complete search history.

(56) References Cited

U.S. PATENT DOCUMENTS

| | | | |
|---|---|---|---|
| 4,933,984 A | 6/1990 | Nakano et al. | |
| 5,033,104 A | 7/1991 | Amano | |
| 5,235,653 A | 8/1993 | Nakano et al. | |
| 5,394,487 A | 2/1995 | Burger et al. | |
| 5,555,101 A * | 9/1996 | Larson et al. | 382/287 |
| 5,748,807 A | 5/1998 | Lopresti et al. | |
| 5,850,490 A * | 12/1998 | Johnson | 382/306 |
| 5,930,393 A | 7/1999 | Ho et al. | |
| 5,943,137 A | 8/1999 | Larson et al. | |
| 6,002,798 A | 12/1999 | Palmer et al. | |
| 6,021,256 A | 2/2000 | Ng et al. | |
| 6,038,351 A | 3/2000 | Rigakos | |
| 6,249,604 B1 | 6/2001 | Huttenlocher et al. | |
| 6,654,495 B1 | 11/2003 | Katoh et al. | |
| 6,778,703 B1 * | 8/2004 | Zlotnick | 382/218 |
| 6,865,290 B1 | 3/2005 | Kohchi | |

* cited by examiner

*Primary Examiner*—Phuoc Tran
(74) *Attorney, Agent, or Firm*—Knobbe Martens Olson & Bear LLP

(57) ABSTRACT

The present invention is a method and system for automated form identification in a forms processing application. Aspects of the form are not used in identifying the form. The identification is accomplished primarily through spatial relationship of entered data in comparison to a plurality of form templates. Each instance of entered data is assessed for location respective of form template field locations. Attributes of the form template fields are provided and a score is assigned based on those attributes and the existence of data. A total score is provided for each of the plurality of form templates. A best score is achieved for one of the plurality of form templates. This form template, the identified form, is used in the forms processing application.

20 Claims, 5 Drawing Sheets

Order Form

Writing for you since 1966

Tony Anderson
141 Orange Avenue
Pasadena    CA    92111

Customer No.
Company Name: **

Ship to address if different:

Name

Address

City    State    Zip Code

Product Selection:

| Item Number | Page | Item Description | Qty | Unit Price | Total Price |
|---|---|---|---|---|---|
| | | | | . | . |
| | | | | . | . |
| | | | | . | . |
| | | | | . | . |
| | | | | . | . |
| | | | | . | . |

SHIPPING AND HANDLING CHARGES

Up to $20 .................... $4.75
$20.01 to $30 ............... $5.75
$30.01 to $40 ............... $6.98
$40.01 to $50 ............... $7.98
$50.01 to $100 ............. $10.75
$100.01 to $150 ........... $11.75
Over $150 .................... $14.00

Additional Charges
FedEx .................... Add $7.50

FedEx
Federal Express
In a hurry?
Choose FedEx
Delivery Service!

Merchandise Total
Shipping & Handling
Sub Total
Sales Tax
Order Total

SATISFACTION GUARANTEED!

Payment Information:

Method of Payment:
☐ Check or Money Order Enclosed    ☐ VISA    ☐ Master Card    ☐ Discover    ☐ AMEX Credit Card Number                                            Exp. Date Signature or Authorization You can use this order form to order from any current catalog

FIG. 4

DETERMINING FORM IDENTIFICATION THROUGH THE SPATIAL RELATIONSHIP OF INPUT DATA

CROSS-REFERENCE TO RELATED APPLICATIONS

This application claims the benefit of the filing date of U.S. Patent Application 60/242,369, filed Oct. 21, 2000 entitled Determining Form Identification Through the Spatial Relationship of Input Data.

BACKGROUND OF THE INVENTION

1. Field of the Invention

This invention relates generally to the identification of form documents. In particular, the invention provides a method for identifying form documents through received data.

2. Description of Related Art

Automatic forms processing systems utilize computer hardware and software to scan forms, identify the form being processed and extract information from the form. Form identification is an essential step in the processing of forms. It represents the ability of the system to automatically select the correct computer-stored form template, which is used to process the current form. Existing forms processing systems utilize graphic information present on the scanned form to identify the computer-stored form template (form template). Such information may include lines and graphics, blocks of text on the form template, special symbols and form identification numbers.

Some form processing systems receive data apart from the form, although a form may have been used to assist in entering data. With these form-processing systems, only the graphic data entered by the user such as name, address and marked choices is electronically transferred to the forms processing system. Thus, none of the graphic features specific to the design of the processed form are available for form identification. A process described below is utilized to identify the form template, in one embodiment, by relying exclusively on the locations of fields filled in by the user. [In another embodiment, the probable content type of those fields is used to determine the form template.]

SUMMARY OF THE INVENTION

In one aspect of the present invention, there is an automated form identification method, comprising storing electronic forms data in a mobile device, receiving the electronic forms data from the mobile device at a forms processing computer, storing a plurality of form templates on the forms processing computer, each form template having a plurality of entry fields and a layout, the layout identifying a form location for each of the entry fields, and identifying a matching form template for the received electronic forms data based on the entry field locations. One of the form templates may have a first field category and a second field category. The method may additionally comprise scoring each of the fields of the form template depending on the field category and whether data is entered for the field. The scoring may include accumulating field scores in a template score, where the form template with the best score may be declared to be the matching template for the received electronic forms data. The first field category may be indicative of a must fill field and the second field category may be indicative of an optional field. Fields assigned to a first field category or second field category may be linked to other fields such that the outcome of a field assigned to a first field category or second field category indicates the category of the other fields. The method may additionally include scoring each of the fields of the form template depending on the field type and whether data of that type is entered for the field. The method may further include scoring each of the fields having a fixed field length based on the character count of the field.

In another aspect of the present invention, there is an automated form identification system, comprising a mobile device capable of storing electronic forms data, a forms processing computer capable of receiving the electronic forms data from the mobile device, a plurality of form templates stored on the forms processing computer, each form template having a plurality of fields and a unique graphic layout, and a form identification processor operating on the forms processing computer, the form identification processor identifying the best matching form template for the received electronic forms data without use of graphic elements. One of the form templates may have a first field category and a second field category. Each of the fields of the form template may be scored depending on whether data is entered for the field, where the field scores may be accumulated in a template score. The form template with the best score may be declared to be the best matching template for the received electronic forms data. The first field category may be indicative of a must fill field and the second field category may be indicative of an optional field. The form identification processor may additionally determine the best score by including scoring of the fields of the form template in response to the field type and whether data of that type is entered in the field. The form identification processor may additionally determine the best score by including a scoring of the fields of the form template in response to the character count of the fields for fields having a fixed field length.

In another aspect of the present invention, there is an automated form identification method, comprising receiving electronic forms data from a forms device at a forms processing computer, storing a plurality of form templates on the forms processing computer, each form template having a plurality of entry fields and a layout, the layout identifying a form location for each of the entry fields, and identifying a matching form template for the received electronic forms data based on the entry field locations. The forms device may include a portable digital notepad or a dropout scanner.

In another aspect of the present invention, there is an automated form identification method, comprising receiving electronic forms data at a dropout scanner, transferring the electronic forms data from the dropout scanner to a forms processing computer, storing a plurality of form templates on the forms processing computer, each form template having a plurality of entry fields and a layout, the layout identifying a form location for each of the entry fields, and identifying a matching form template for the electronic forms data based on the entry field locations.

BRIEF DESCRIPTION OF THE DRAWINGS

FIG. 4 displays a sample form used in the forms processing method.

DETAILED DESCRIPTION OF THE INVENTION

Figure 1:
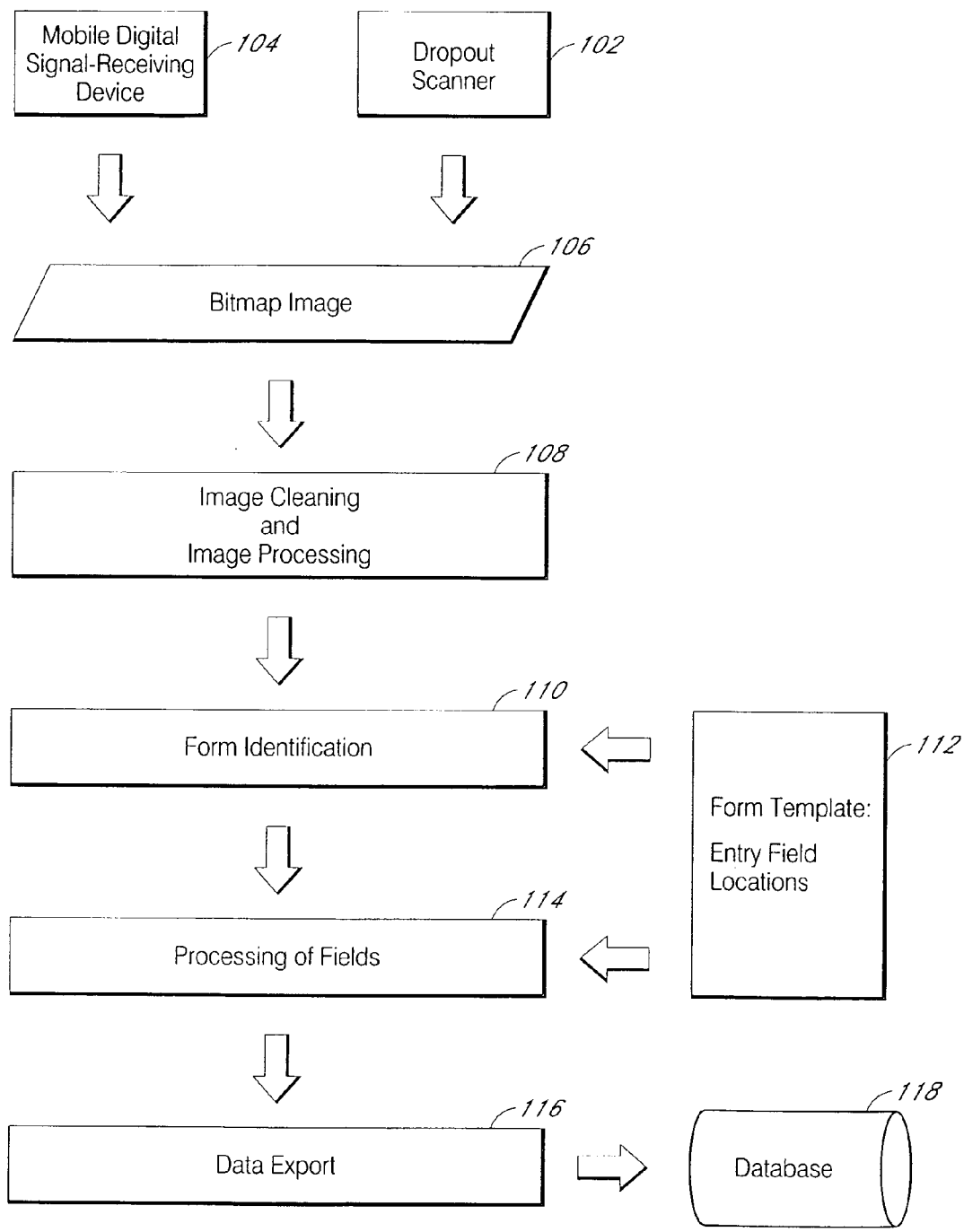
FIG. 1 shows the top-level flow of a forms processing method.

FIG. 1 depicts a forms processing scheme for extracting data from filled forms. The process uses a dropout scanner 102 or mobile digital signal-receiving device 104 to create a bitmap image of the data 106. The bitmap image undergoes image cleaning and processing 108 prior to being submitted to a form identification process 110. The form identification process utilizes a form template having defined entry field locations 112. The bitmap images of processed forms are searched to determine locations of data entry. The locations of data entry are compared to defined entry locations in stored electronic form templates. A best match form template is identified in response to the comparison. Other form identification steps may be incorporated to provide a greater probability in identifying the best match form template. These steps are discussed in detail below. A forms processing computer may be used to perform these steps. Once the form is identified precise entry field locations are known for the processed form. Knowledge of entry field locations allows processing of fields 114, which primarily includes extracting the entered data. A data export 114 sends the extracted data to a database 118. The creation and interpretation of forms is described in U.S. Pat. No. 5,555,101, which is hereby incorporated by reference.

Figure 2:
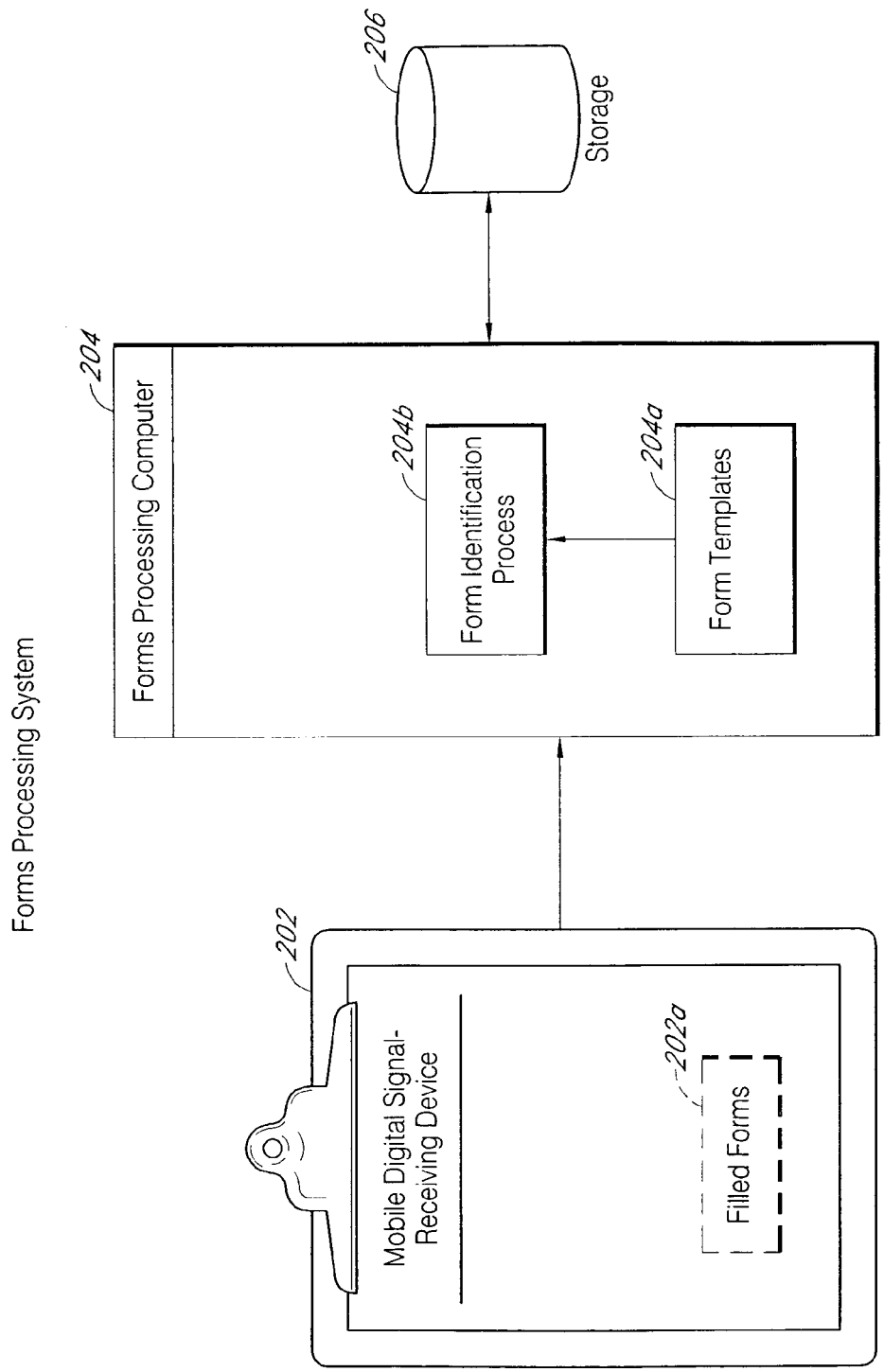
FIG. 2 is a graphic representation of a forms processing method initiated with a dropout scanner.

FIG. 2 is a graphic representation showing a forms processing system using a mobile digital signal-receiving device 202. Various mobile digital signal-receiving devices may be utilized by the system. In one embodiment, a mobile digital signal-receiving device equipped with a special pen capable of digitally recording graphic information is used to electronically fill forms. In this embodiment, the mobile device (e.g., CROSSPAD, available from A. T. Cross Company) can be carried around separately from the forms processing computer and is able to electronically store a significant amount of entered digital data. The exemplary CROSSPAD functions as a clipboard, allowing users to write thereon. A paper form or form image may be placed atop the CROSSPAD. The form or form image may be used as an overlay for guiding the user to the proper locations for entering the data. The overlay may be positionally affixed to the CROSSPAD as a notepad or singular piece of paper. In another embodiment, a mobile digital signal-receiving device may embed an image of the form within the device. Only the entered data is digitized for use by the forms processing computer. Neither the form nor form image is utilized. The CROSSPAD receives the data as digital signals from the special pen and stores the data and spatial arrangement of the data in memory. The stored data arrangement represents storage of filled forms 202(a). The stored image data (e.g., a bitmap) is loaded into the forms processing computer 204 at a later time.

The exemplary CROSSPAD mobile digital signal-receiving device is essentially a portable digital clipboard that also functions as a digital signal-receiving and storage device. As the user writes to the form with the special pen, the writings are organized into digitized bitmaps, allowing them to be later uploaded to a forms processing computer. The special pen is a digital pen equipped with a small radio frequency (RF) transmitter to allow users to complete the forms affixed to the digital clipboard. An exemplary (unfilled) form that may be one sheet of the notepad tablet or a singular piece of paper is shown in FIG. 4. The RF transmitter sends pen stroke data to the clipboard device automatically when the pen makes contact with the form. Signals from the digital pen are stored as digital data (a time series of points) in the memory of the clipboard device. Selected handwriting may be converted to a bit-map for exporting from the device. In one embodiment, the clipboard device may include one MB of flash read-only memory (ROM), which may store up to 50–80 pages of data. The personal computer to which the clipboard device uploads the data uses a Pentium or better processor, and operates using the Windows 95, 98, or NT 4.0 operating software.

Figure 3:
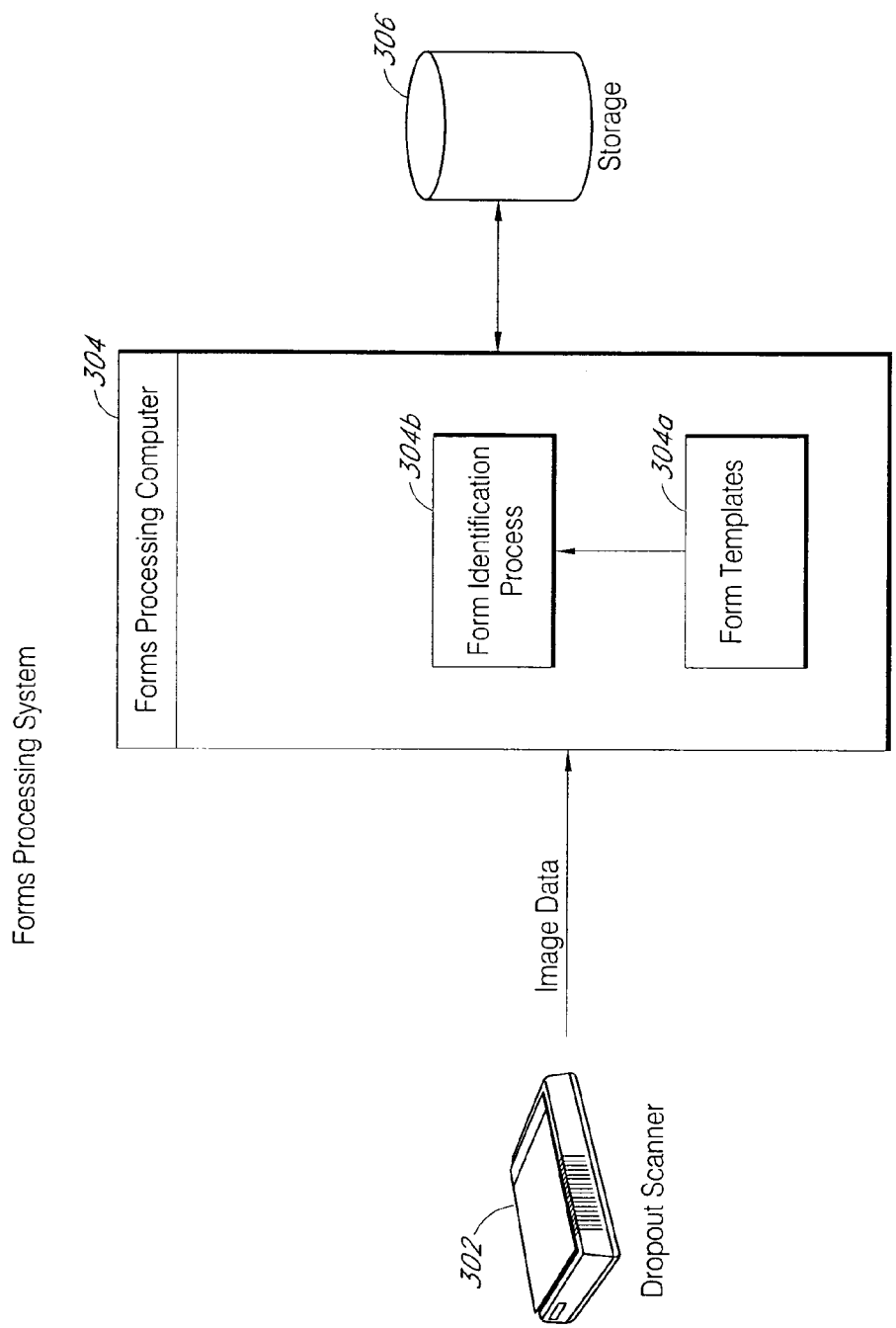
FIG. 3 is a graphic representation of a forms processing method initiated with a mobile digital signal-receiving device.

In another embodiment, the input device may be what is known as a dropout scanner, such as a model 8125DS scanner available from Bell & Howell. FIG. 3 is a graphic representation showing a forms processing system using a dropout scanner 302. The scanner includes a light bulb of a specific color, e.g., red or green. Forms may be printed using a light ink which matches the color of the light bulb. In one embodiment, the entire form is printed using the matching light ink color, which allows for one-color dropout forms. When such a form is completed by a user and then is scanned by the scanner, the scanner does not detect the specific ink color of the form. However, the user enters the data in a different color. The scanner detects and captures the differently colored data. This data is exported as image data (e.g., a bitmap) to a forms processing computer 304.

In both the forms processing systems shown in FIGS. 2 and 3, the forms processing computer 204/304 receive bitmap images consisting of the data entered through the mobile digital signal-receiving device 202 or dropout scanner 302. This data does not explicitly specify the form template 204(a)/304(a) to be used for processing the form. This data also does not include any of the graphic data utilized for form identification with scanned or faxed forms, such as form identification numbers, lines, preprinted text or other graphic elements from the form template. In one embodiment, image data received by the forms processing system may consist exclusively of the personal information handwritten, hand-typed or electronically entered by the applicant. This information is entered into appropriate fields on the form as specified by the form layout. The form identification process 204(b)/304(b), included in the forms processing computer 204/304, utilizes the location of these entry fields in the form template, compares them with the locations of written text in the currently processed form, and selects the best fitting form template.

In addition to the basic form identification process, other criteria may be included in the process to more accurately identify the correct form. For instance, the data type and data length may be factored into the selection process. Using this additional criterion, form fields are labeled as alpha or numeric. If numeric data entries are found in a field labeled as an alpha field, the identification process is affected accordingly. Another criterion may utilize fields having an assigned fixed field length. The identification process is weighted accordingly if the number of characters in the field are the same as the assigned field length.

The form identification process is described in greater detail below. Once the form has been identified, interpretation of the fields specific to a particular form and further processing of the data can resume in the forms processing computer 204/304. The extracted data is stored in a database 206/306.

Form Identification Process

Figure 5:
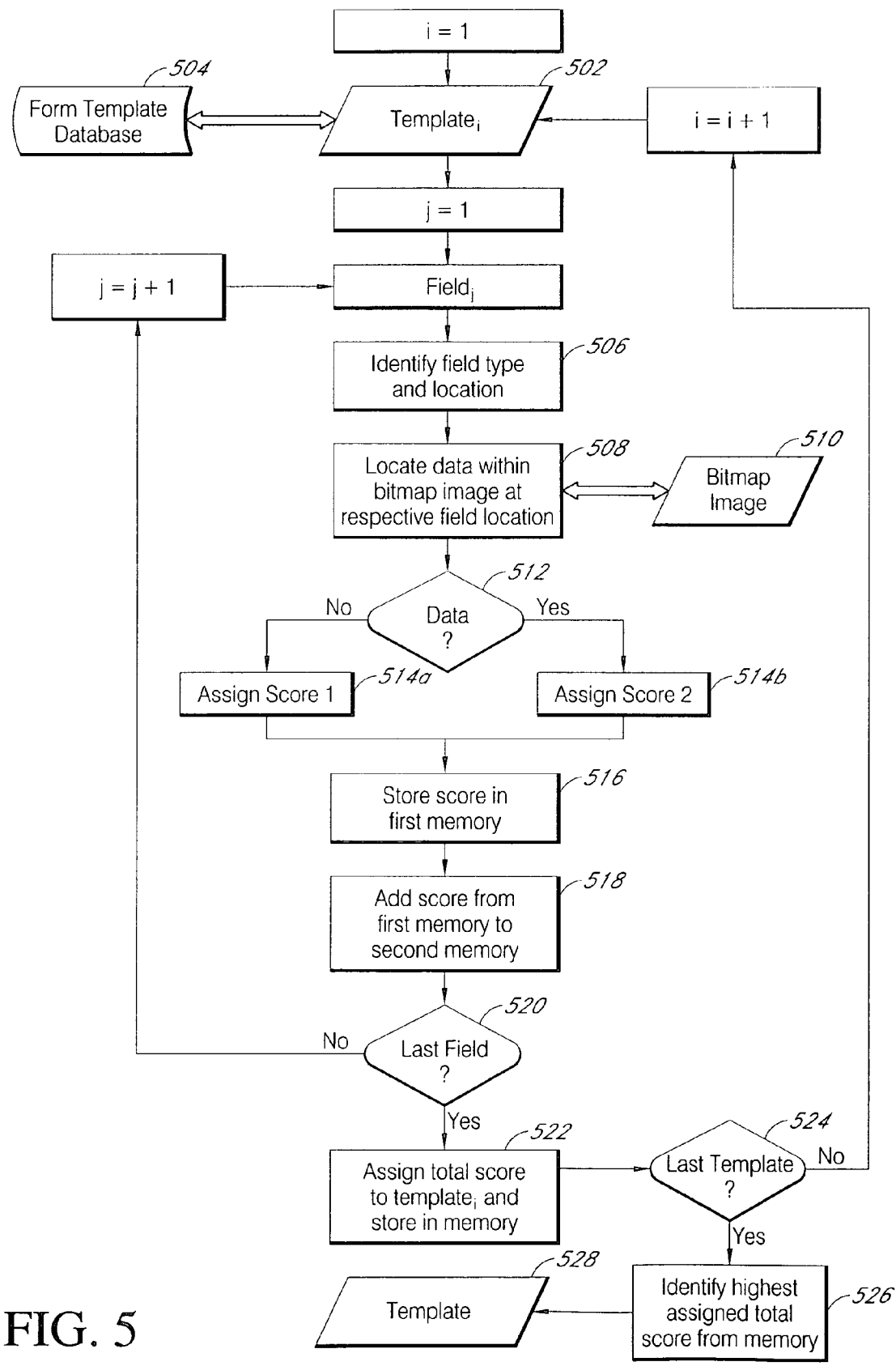
FIG. 5 shows the detailed flow of the form identification process.

FIG. 5 shows a flowchart of the basic form identification process. This reiterative process compares data locations in a data image with corresponding locations of form fields on a form template. A point system establishes a best match for a given data image with respect to two or more form templates. The best match form template is identified as the form and corresponding with the given data input.

More particularly, a first form template 502 having field locating information and field type information is accessed from a form template database 504 having two or more different form templates. The field location identifying information enables identification of the location of the first form field in the bitmap image. Field type information identifies the field classification as either "must fill" or "optional". The field type and location for the first field is identified 506. The location of the first form field in the form template is located 508 in relative correspondence with a datum on a bitmap image 510. A determination 512 is made regarding the existence of a datum within the field boundaries. Depending on the field type, a score is assigned 514(a)/514(b) for the given field location. In one embodiment, if the field type is "must fill", by way of example a score of 1.0 may be given if a datum is found to exist within the field. If there is no datum within the field, a negative score of 0.5 may be assigned. If the field type is "optional", a score of 0.5 may be assigned for an existing datum and 0.0 may be assigned for the nonexistence of a datum. The score is stored in first memory 516 and is added to a preliminary total score in a second memory 518. The process repeats for each field 520 in the form template. The score will increase, decrease or remain the same with each process loop corresponding with each field. When the last field is reached, a total score is assigned which corresponds to the given form template 522 used for that first template loop. A determination is made if the form template was the last template 524 in the form template database. If it is not, a subsequent form template is accessed and the process is repeated. When the last form template is accessed and analyzed, the form template having the corresponding best score is identified 526 as the form used or corresponding with the given input data. The identified form template 528 is then used in the forms processing system.

The form identification process may be refined further by adjusting the scores of individual fields based on specific characteristics of the fields. In one such refinement, a data type assignment may be given in the form template for a given field. The score for that field may be adjusted according to the type of data recognized at that field location. For example: If a numeric field type is assigned for a data field used for entering a social security number, the score for the form template would be improved if numerals were recognized in that field and weakened if alpha characters were recognized.

Additional scoring weight may be given for finding the correct number of characters or appropriate template characters, such as "/" or "–" in the case of date fields, when the user is allowed to enter such characters.

Different fields on a form template fall into one of the two categories: MUST FILL and OPTIONAL. The MUST FILL fields may be represented by the name of the applicant, address, social security number and so forth. Choice fields, additional names, addresses and numbers may be examples of OPTIONAL fields. On a filled out form, either type of field may be filled or missing (not filled). Referring to Table 1, the following scheme of weights may be adopted to count filled and missing fields, and to compute the score for each form field and total score for each form template in the currently processed set.

TABLE 1

| Field type | Field is filled | Field is missing |
|---|---|---|
| MUST FILL | 1.0 | −0.5 |
| OPTIONAL | 0.5 | 0.0 |

For MUST FILL fields, the presence of text at the expected location yields a weight of one, while a missing MUST FILL field contributes a negative number. OPTIONAL fields contribute zero when missed and a number between zero and one when filled. The total score for a form is the sum of weights for all fields in the template. The template with the best score yields the correct form.

To provide a greater degree of accuracy in the form selection process, the scoring can be further weighted according to field characteristics, as described above. Identification of forms using field characteristics is described in U.S. patent application Ser. No. 09/656,719, entitled "Method and System for Searching Form Features for Form Identification", which is hereby incorporated by reference. By way of example, as shown in Table II below, fields may be assigned a specific field type or given a fixed field length. Such fields allow the method to provide the greater degree of accuracy. Referring to Table II, when all the characters of a given field are recognized to be those of the assigned field type, a positive score is added. When a character is found that does not correspond to the assigned field type, the score is decreased a fractional negative number. For fields that are assigned a fixed field length, a positive score is added when the number of characters corresponds to the assigned field length. A negative fractional score is added for each character count difference.

TABLE II

| Field Characteristic | All Correct | Incorrect |
|---|---|---|
| ALPHA/NUMERIC | 0.5 | −0.2/incorrect char |
| LENGTH (fixed length fields) | 0.5 | −0.2/char count diff |

Thus, it is apparent that there has been provided in accordance with the present invention, a method for identifying a form through the spatial relationship of the entered data that satisfies the advantages set forth above. Although the preferred embodiment has been described in detail, it should be understood that various changes, substitutions, and alterations could be made herein. For example, different scoring weights could be given for the various types of fields. Furthermore, field characteristics other than those discussed could be used to further refine the score. Other examples are readily ascertainable by one skilled in the art and could be made without departing from the spirit and scope of the present invention as defined by the following claims.

Features and Advantages

Determining Form Identification through the Spatial Relationship of Input Data facilitates better utilization of electronic input devices such as IBM's CROSSPAD. Such devices provide temporary storage for the entered data, which can be downloaded into the computer at a later time.

Processing of the data is carried out independently of the data collection. When applied to automatic forms processing, the versatility of CROSSPAD-like devices allows it to be used in the field and under conditions prohibiting the use of a computer station. The ability to identify the correct form template exclusively from the user-entered graphic data represents a new functional element and is fundamental in the forms processing scheme explained herein.

I claim:

1. An automated form identification method, comprising:
storing electronic forms data in a digital signal receiving device;
receiving the electronic forms data from the digital signal receiving device at a forms processing computer;
storing a plurality of form templates on the forms processing computer, each form template having a plurality of entry fields and a layout, the layout identifying a form location for each of the entry fields; and
identifying a matching form template for the received electronic forms data based on the entry field locations.

2. The method of claim 1, wherein:
the digital signal receiving device is a mobile digital signal receiving device.

3. The method of claim 1, wherein:
the digital signal receiving device is a dropout scanner.

4. The method of claim 1, wherein:
the plurality of entry fields has a first field category and a second field category.

5. The method of claim 4, further comprising:
scoring each of the entry fields for each of the plurality of form templates based on field category and the presence of data.

6. The method of claim 5, further comprising:
accumulating a score for each of the plurality of form templates, wherein the form template with the best score is determined to be the form template matching the received electronic forms data.

7. The method of claim 6, wherein:
the first field category is indicative of a must fill field and the second field category is indicative of an optional field.

8. The method of claim 7, wherein received electronic forms data in must fill fields contributes most to the best score and received electronic forms data in optional fields contributes to the best score.

9. The method of claim 7, wherein the absence of received electronic forms data in must fill fields detrimentally affects the best score.

10. The method of claim 6, further comprising:
assigning a field category to a data entry field in response to the score given to another data entry field.

11. The method of claim 6, further comprising:
assigning a field type to each of the entry fields;
scoring each of the entry fields in response to the field type and in response to received electronic forms data corresponding to the entry field is data of the field type.

12. The method of claim 6, further comprising:
assigning a fixed field length to at least one of the plurality of entry fields;
scoring the entry fields having an assigned fixed field length in response to the character count of the received electronic forms data.

13. An automated form identification system, comprising:
a digital signal-receiving device for storing electronic forms data;
a forms processing computer capable of receiving the electronic forms data from the digital signal-receiving device;
a plurality of form templates stored on the forms processing computer, each form template having a plurality of entry fields and a graphic layout;
and a form identification processor for identifying the best matching form template for the received electronic forms data.

14. The automated form identification system of claim 13, wherein: the form templates have a first field category and a second field category.

15. The automated form identification system of claim 13, further comprising:
means for scoring each entry field of the form template in response to received electronic form data entered for the entry;
means for accumulating the field scores into a template score; and
means for identifying the best matching form template in response to the best accumulated score for the received electronic forms data.

16. The automated form identification system of claim 13, further comprising:
means for assigning a first field category indicative of a must fill field, and
means for assigning a second field category indicative of an optional field.

17. An automated form identification method, comprising:
receiving electronic forms data from a forms device at a forms processing computer;
storing a plurality of form templates on the forms processing computer, each form template having a plurality of entry fields and a layout, the layout identifying a form location for each of the entry fields; and
identifying a matching form template for the received electronic forms data in response to the entry field locations.

18. The automated form identification method of claim 17, wherein:
the forms device is a mobile digital signal-receiving device.

19. The automated form identification method of claim 17, wherein:
the forms device is a dropout scanner.

20. An automated form identification method, comprising:
receiving electronic forms data at a dropout scanner;
transferring the electronic forms data from the dropout scanner to a forms processing computer;
storing a plurality of form templates on the forms processing computer, each form template having a plurality of entry fields and a layout, the layout identifying a form location for each of the entry fields; and
identifying a matching form template for the electronic forms data based on the entry field locations.

* * * * *